No. 737,592. PATENTED SEPT. 1, 1903.
J. DICKSON.
WIRE FASTENER.
APPLICATION FILED JUNE 29, 1900.
NO MODEL.
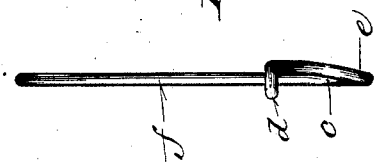
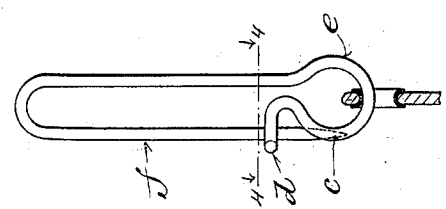
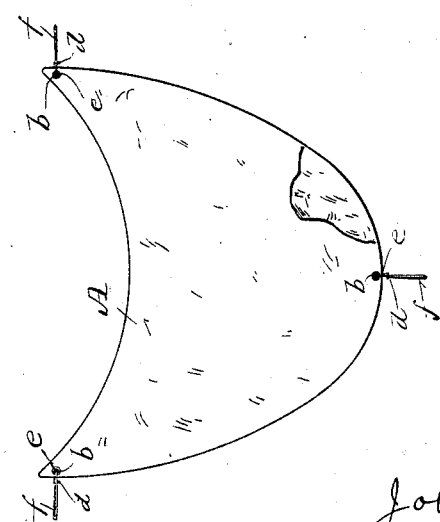
Witnesses
Geo. W. Young
N. E. Oliphant
Inventor
John Dickson.
By H. G. Underwood
Attorney No. 737,592. Patented September 1, 1903.

UNITED STATES PATENT OFFICE.

JOHN DICKSON, OF RACINE, WISCONSIN.

WIRE FASTENER.

SPECIFICATION forming part of Letters Patent No. 737,592, dated September 1, 1903.

Application filed June 29, 1900. Serial No. 22,033. (No model.)

*To all whom it may concern:*

Be it known that I, JOHN DICKSON, a citizen of the United States, and a resident of Racine, in the county of Racine and State of Wisconsin, have invented certain new and useful Improvements in Wire Fasteners; and I do hereby declare that the following is a full, clear, and exact description thereof.

My invention has for its main object to provide simple economical fasteners especially designed for use in connection with armpit-shields whereby the latter may be readily attached to garments or as readily detached from same, said invention consisting in what is hereinafter particularly set forth with reference to the accompanying drawings and subsequently claimed.

Figure 1 of the drawings represents a plan view of an armpit-shield provided with fasteners in accordance with my invention, one flap of the shield being torn; Fig. 2, a similar view of one of the fasteners, a portion of the shield therewith being in section; Fig. 3, an edge view of said fastener, and Fig. 4 a sectional view of same on the plane indicated by line 4 4 in the second figure.

Referring by letter to the drawings, A indicates an armpit-shield of common knowledge, having a flap thereof provided with eyelets $b$ at intervals thereof, but it is practical to omit the eyelets. Engaging each of the eyelets I show one of my improved fasteners made from a single wire, this wire being preferably brass nickel-plated. One end of the wire is preferably pin-pointed, as shown at $c$, and the other end of said wire is bent to form an open hook $d$ and a circular yoke $e$, the hook being offset from the contracted neck of the yoke, at a right angle thereto. At a predetermined distance from its combined hook and yoke end the wire is recurved, and the length of its recurved stretch $f$ is such as to permit of its being sprung into engagement with the hook, and the point extremity $c$ of this stretch overlaps a side of the yoke $e$, but does not extend forward of the bend of same, whereby said bend constitutes a guard for the point of the fastener when the latter is closed.

The fastener being open, its point, blunt or sharp, is run through an eyelet of the armpit-shield or the material of this shield, and thereafter said fastener is manipulated to engage the yoke portion $e$ thereof with said shield, neck contraction of the yoke requiring that the engagement be forcibly effected, whereby under ordinary circumstances the aforesaid fastener will be held in working position. To fasten the armpit-shield to a garment, the recurved point stretches of the several fasteners in connection with said shield are engaged with said garment and subsequently caught in the hook bends $d$ of said fasteners. To detach the shield, it is obviously only necessary to open each fastener and withdraw the point stretch of same from the garment.

While fasteners of the above description are especially designed for use in connection with armpit-shields, they may be utilized for other purposes—such, for instance, as a means for securing tags to goods of various kinds.

Having thus described my invention, what I claim as new, and desire to secure by Letters Patent, is—

A fastener that consists of a single wire having one end thereof bent to form a circular yoke contracted at the neck and an open hook having its shank extending outward from the yoke-neck at a right angle thereto, the remainder of the wire being bent without coiling to have engagement with the hook and terminate alongside of the yoke forward of the neck of same when the fastener is closed.

In testimony that I claim the foregoing I have hereunto set my hand, at Racine, in the county of Racine and State of Wisconsin, in the presence of two witnesses.

JOHN DICKSON.

Witnesses:
 ROY AVARD,
 LOUIS F. KLEIN.